United States Patent [19]
Yamate

[11] Patent Number: 5,703,703
[45] Date of Patent: Dec. 30, 1997

[54] HOLOGRAPHIC ORNAMENT

[75] Inventor: Takashi Yamate, Matsusaka, Japan

[73] Assignee: Central Glass Company, Limited, Yamaguchi, Japan

[21] Appl. No.: 478,577

[22] Filed: Jun. 7, 1995

Related U.S. Application Data

[63] Continuation of Ser. No. 75,244, Jun. 11, 1993, abandoned.

[30] Foreign Application Priority Data

Jun. 12, 1992 [JP] Japan ................................ 4-040359

[51] Int. Cl.⁶ .................................................. G02B 5/32
[52] U.S. Cl. ............................. 359/1; 359/567; 359/15
[58] Field of Search ............................. 359/1, 3, 15, 19, 359/549, 567, 599; 283/86

[56] References Cited

U.S. PATENT DOCUMENTS

| | | | |
|---|---|---|---|
| 3,017,713 | 1/1962 | Butler | 359/549 |
| 4,014,602 | 3/1977 | Ruell | 359/2 |
| 4,799,739 | 1/1989 | Newswanger | 359/462 |
| 5,101,193 | 3/1992 | Smith et al. | 359/15 |
| 5,223,357 | 6/1993 | Lovison | 359/1 |

*Primary Examiner*—Jon W. Henry
*Attorney, Agent, or Firm*—Keck, Mahin & Cate

[57] ABSTRACT

A holographic ornament comprises a hologram which has an operative surface. In one embodiment, the operative surface is masked by a masking member. The masking member is formed with at least one letter-shaped cut through which a part of the operative surface of the hologram is exposed. In order to protect the masking member and the exposed part of the operative surface, a transparent protection cover member covers them. In the other embodiment, the hologram per se is formed with at least one through cut which is shaped like a letter or the like. In order to protect the operative surface, a transparent protection cover member covers the same.

4 Claims, 2 Drawing Sheets

HOLOGRAPHIC ORNAMENT

This is a continuation application of Ser. No. 08/075,244, filed on Jul. 11, 1993, now abandoned.

BACKGROUND OF THE INVENTION

1. Field of the Invention

The present invention relates in general to holographic ornaments which can display certain optical images on automotive glass windows, automotive bodies, architectural glass windows, architectural walls, partition members, toys and the like.

2. Description of the Prior Art

In holography, a hologram is used which records thereon the pattern of interference between coherent light reflected from the object of interest, and light that comes directly from the same source or is reflected from a mirror. However, due to its inherent construction, in the holography, the optical images which can be displayed are only those actually recorded by the hologram. That is, it is impossible to display optical images other than those actually recorded by the hologram. Furthermore, the optical images displayed by the conventional hologram are compelled to have unclear peripheries.

SUMMARY OF THE INVENTION

It is therefore a first object of the present invention to provide a holographic ornament which can display various types of optical images other than those actually recorded by the hologram.

It is a second object of the present invention to provide a holographic ornament which can display optical images having clearly and sharply bounded peripheries.

According to the present invention, there is provided a holographic ornament which comprises a hologram having an operative surface; masking means for masking given portions of the operative surface thereby to provide an information display front surface on the operative surface; and a transparent protection means covering the information display front surface.

According to the present invention, there is further provided a holographic ornament which comprises a hologram having an operative surface; means defining in the hologram at least one through cut thereby to provide an information display front surface on the operative surface; and a transparent protection means covering the information display surface.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

First Embodiment

Figure 1:
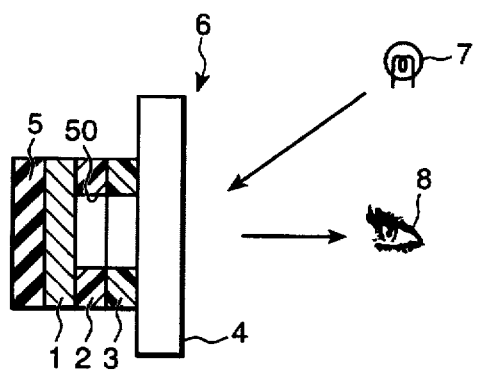
FIG. 1 is a schematic side view of a holographic ornament which is a first embodiment of the present invention.
Figure 2:
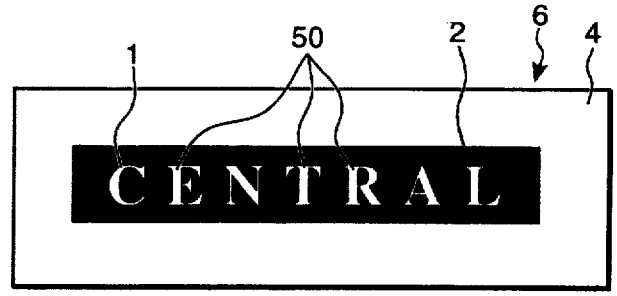
FIG. 2 is a plan view of the holographic ornament of the first embodiment.
Figure 3:
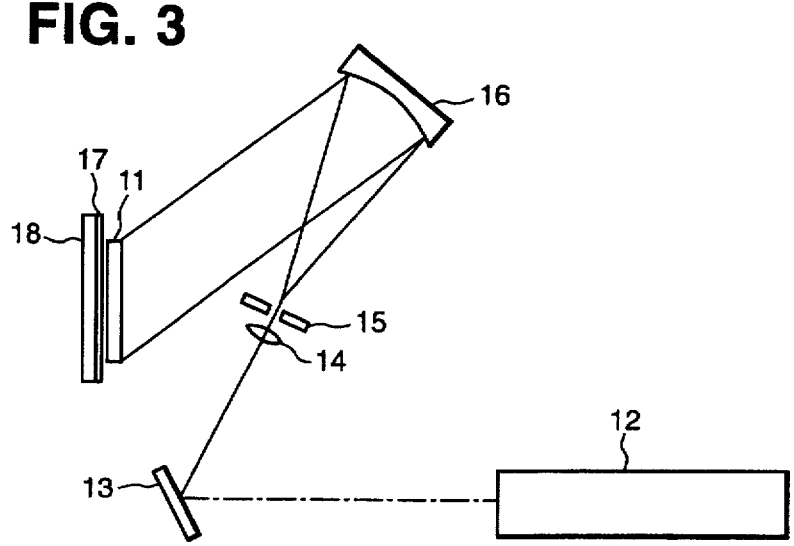
FIG. 3 is a schematic illustration showing a method of producing a hologram used in the first embodiment.

Referring to FIGS. 1 to 3, there is shown a holographic ornament 6 of a first embodiment of the present invention.

In the first embodiment, there is employed a hologram 1 given portions of which are masked by masking means 2. The following is the method of producing the holographic ornament.

1. Production of Hologram

A glass plate is applied with dichromate gelatin (photosensitive material) to produce a photographic plate 11. Then, the photographic plate 11 is set in a proper position of an optical system in such a manner as is shown in FIG. 3. The optical system comprises an argon laser source 12 which can emit a laser beam of 514.5 nm in wave length, a laser reflector 13 which reflects the laser beam from the laser source 12 toward an objective lens 14 of a microscope, a pin hole member 15 through which the laser beam from the lens 14 passes to form an expanded laser beam, a concave mirror 16 which reflects the expanded laser beam to form a broad and parallel laser beam directed toward a light diffusing plate 18 which may be a ground glass coated with a silver paint 17. As shown, the photographic plate 11 is put on the light diffusing plate 18, so that a part of the laser beam, which has passed through the photographic plate 11 and has been diffusedly reflected by the diffusing plate 18, and the incident laser beam from the concave mirror 16 record the interference pattern. The photograph plate 11 is thereafter developed to form a hologram 1.

2. Production of Ornament

As is seen from FIG. 1, a protection tape 5 is bonded to a back surface of the produced hologram 1 to form a first layered unit (1+5). After being trimmed at the periphery thereof, the first layered unit (1+5) is mounted to a transparent base plate 4 with an interposal of a second layered unit (2+3) therebetween. With these steps, a holographic ornament 6 of the first embodiment is produced.

The second layered unit (2+3) comprises an opaque masking tape 2 and a transparent double-coated adhesive tape 3 which are combined. Preferably, the masking tape 2 is colored black. As will be understood from FIGS. 1 and 2, the second layered unit (2+3) is formed with a plurality of through cuts 50 which are shaped into the letters "C", "E", "N", "T", "R", "A", "L" in the illustrated embodiment. Thus, when the holographic ornament 6 is properly assembled in the above-mentioned manner, the surface of the hologram 1 is viewed through the letter-shaped cuts 50 and the transparent base plate 4, as is understood from FIG. 2. The transparent base plate 4 may be glass plate, acrylate resin, polycarbonate resin or the like.

3. Operation

When, as is seen from FIG. 1, the holographic ornament 6 thus produced is applied with a light from a white light source 7 (or halogen light source), the light directed to the hologram 1 is diffracted toward the same side of the light source. As the hologram 1 diffracts the white light diffusedly and wavelength-selectively, to a viewer 8 in front of the holographic ornament 6, there is given the impression that a colored light source corresponding to the diffractive wavelength is located on the surface of the hologram 1, which allows the letter-shaped cuts 50 to be clearly recognized by the viewer 8. Because the letters "C", "E", "N", "T", "R", "A", "L"are provided by the cuts 50 in the opaque masking tape 2, the letters thus displayed through the transparent base plate 4 can have each a clear periphery, as will be understood from FIG. 2. The letters are displayed with a visionary green color due to the wavelength selectivity of the hologram 1.

Second Embodiment

Figure 4A:
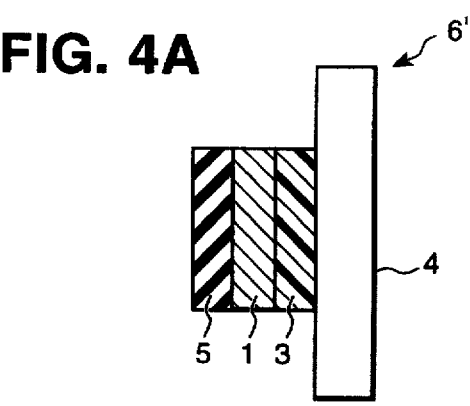
FIG. 4A is a view, similar to FIG. 4, showing a further side view of the embodiment of FIG. 4.
Figure 4B:
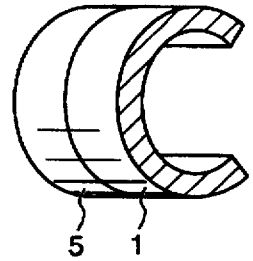
FIG. 4B is a side view of a cutout letter from the holographic ornament of FIG. 4A, a further shown in FIG. 5.
Figure 4:
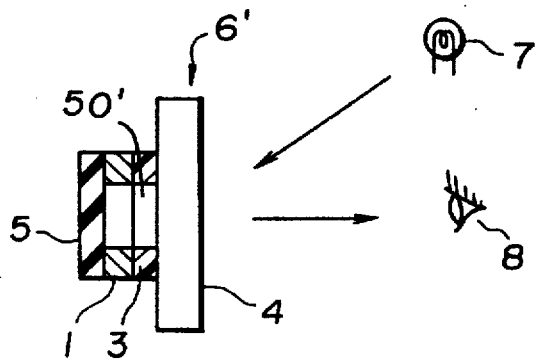
FIG. 4 is a view similar to FIG. 1, but showing a second embodiment of the present invention.
Figure 5:
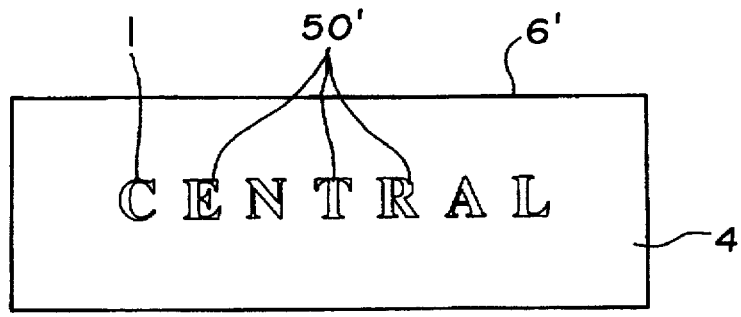
FIG. 5 is a view similar to FIG. 2, but showing the second embodiment.

Referring to FIGS. 4 and 5, there is shown a holographic ornament 6' of a second embodiment of the present invention.

In this second embodiment, the hologram per se is formed with a plurality of through cuts which are shaped into the letters "C", "E", "N", "T", "R", "A", "L", as is seen from FIG. 5.

1. Production of Hologram

The same method as that of the above-mentioned first embodiment is carried out to produce the hologram 1.

2. Production of Ornament

As is seen from FIG. 4, 4A and 4B, the hologram 1 is formed with a plurality of through cuts 50' which are shaped into the letters "C", "E", "N", "T", "R", "A", "L", as is seen from FIG. 5. A protection tape 5 is bonded to a back surface of the hologram 1 to form a first layered unit (1+5) as shown in FIG. 4B. Thereafter, the first layered unit (1+5) is mounted to a transparent base plate 4 through a transparent double-coated adhesive tape 3 and 4A. With this, a holographic ornament 6' of the second embodiment is produced. Thus, the surface of the hologram 1, which is formed with the letter-shaped cuts 50', is viewed through the transparent double-coated adhesive tape 3 and the transparent base plate 4.

3. Operation

When, as is seen from FIG. 4, the holographic ornament 6' thus produced is applied with a light from a light source 7, the light directed to the hologram 1 is diffracted toward the same side of the source. As the hologram 1 diffracts the white light diffusedly and wavelength-selectively, the viewer 8 in front of the ornament 6' is given such an impression that a colored light source corresponding to the diffractive wavelength is located on the surface of the hologram 1, which allows the letter-shaped cuts 50' to be clearly recognized by the viewer 8. Because the letters "C", "E", "N", "T", "R", "A", "L" are provided by the cuts 50' in the hologram 1 per se, the letters thus displayed through the transparent base plate 4 can have each a clear periphery, as will be understood from FIG. 5.

Third Embodiment

Figure 6:
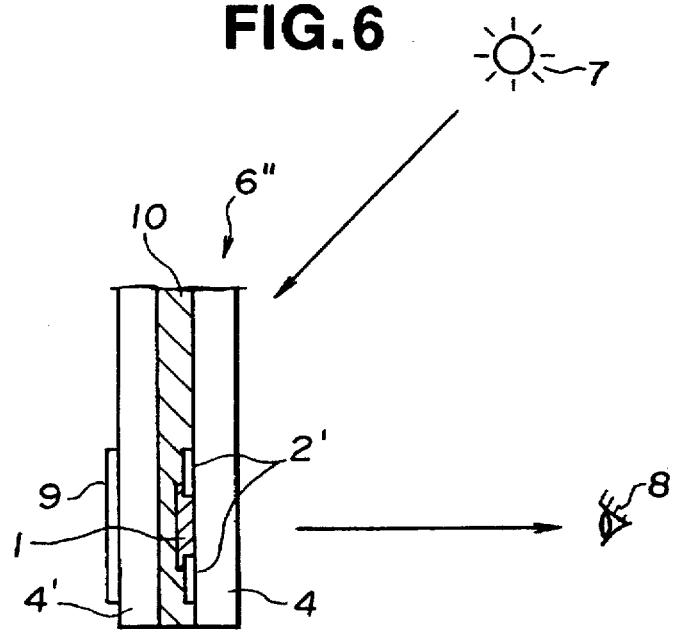
FIG. 6 is a partial side view of a holographic ornament which is a third embodiment of the present invention.

Referring to FIG. 6, there is shown a holographic ornament 6" of a third embodiment of the present invention. As will become clear apparent hereinafter, the ornament 6" is incorporated with a laminated glass of automotive window.

1. Production of Hologram

The same method as that of the above-mentioned first embodiment is carried out to produce the hologram 1.

2. Production of Ornament

As is seen from FIG. 6, a ceramic paste is applied to a given rectangular area of an inner glass sheet 4' to form thereon a rectangular opaque layer 9. For this application, a known screen printing is used. The ceramic paste is also applied to an outer glass sheet 4, but applied to only given portions of the sheet 4 to leave a plurality of blank portions in the applied opaque layer 2'. The blank portions are shaped into the letters "C", "E", "N", "T", "R", "A", "L" respectively. These inner and outer glass sheets 4' and 4 are heated to be shaped or bent. During this, the ceramic paste layers 9 and 2' are baked and thus form rigid opaque films 9 and 2' on the respective glass sheets 4'and 4. The perforated opaque film 2' on the outer glass sheet 4 thus serves as a masking means, as will become apparent as the description proceeds.

Then, the hologram 1 is bonded on the perforated opaque film 2' in a manner to cover the blank portions of the film 2'. Then, the two glass sheets 4' and 4 are put together with a sheet of transparent resinold (viz., polyvinyl butyral or the like) 10 therebetween and led into an autoclave to produce a laminated glass. The two opaque films 9 and 2' and the hologram 1 constitute the holographic ornament 6" installed in the laminated glass.

3. Operation

When, as is seen from FIG. 6, the holographic ornament 6" in the laminated glass is applied with a light from a light source 7 for example the sun, the viewer 8 in front of the ornament 6" is given such an impression that a green-colored light source corresponding to the diffractive wavelength is located on the surface of the hologram 1, which allows the letter-shaped blank portions to be clearly recognized by the viewer 8. As the letters "E", "N", "T", "R", "A", "L" are provided by the blank portions of the opaque film 2', the letters thus displayed through the laminated glass 4 can have each a sharply bounded periphery.

In the following, modifications and applications of the present invention will be described.

By changing the laser source 12 (see FIG. 3) in producing the hologram 1, it becomes possible to permit the hologram 1 to show various colors (such as, red, yellow, blue, orange, etc.,) other than green. Furthermore, if a so-called multiple exposure technique is employed for producing the hologram 1, much more colors are obtained from the same.

Although the holograms used in the aforementioned three embodiments are of the Denisyuk type which is simple in production, other types of holograms can be also used in the present invention, which are for example, the shadow type, image type, reflection type and the like. For producing the shadow type hologram, the silver paint 17 (see FIG. 3) is removed from the light diffusing plate 18 and the laser beam is directed toward the photographic plate 11 from the back side of the light diffusing plate 18. Furthermore, for producing the image type, a figured plate is used as a substitute for the light diffusing plate 18. When the reflection type hologram is used, the ornament displays the light source 7 per se.

In stead of the above-mentioned dichromate gelatin, other types of photosensitive materials are also usable for producing the photographic plate, which are silver-halide, photo polymer, photo resist and the like.

Although, in the foregoing description, the holographic ornaments 6, 6' and 6" are described as having a transparent base plate (or outer glass sheet) 4, a transparent protection tape may be used as a substitute for such base plate 4. That is, the transparent protection tape is arranged to cover the information display surface of the hologram 1. However, in this case, a reinforcing plate is used for assuring the mechanical strength of the ornament. The reinforcing plate may be of a metal, cement, wood, cloth, ceramic paper or the like.

If the diffusing plate 18 (see FIG. 3) has a plurality of small patterns formed thereon, the hologram 1 thus produced shows a plurality of small optical images which correspond to the small patterns on the diffusing plate 18. In this case, each letter "C", "E", "N", "T", "R", "A"or "L" can be constituted by such small optical patterns.

As the light source 7 (see FIG. 1) for illuminating the holographic ornament 6, a laser source, fluorescent lamp, fluorescent character display tube, cathode lay tube (CRT) and the like are usable in addition to the above-mentioned white light source and the sun.

What is claimed is:

1. A holographic ornament consisting essentially of
    a hologram of reflection type having an operative surface by and on which an external light is diffused and reflected;
    an opaque tape covering said operative surface of said hologram, said opaque tape being formed with at least one through cut through which the operative surface of the hologram is exposed, said through cut being shaped into a letter;
    a transparent base-member which covers said opaque tape, said transparent base member being constructed to be a structural base of the holographic ornament;
    a protection tape bonded to a back surface of said hologram;
    a transparent double-coated adhesive tape member by which said transparent base member and said opaque tape member are bonded to each other.

2. A holographic ornament consisting essentially of:
    a hologram of reflection type having an operative surface by and on which an external light is diffused and reflected;
    means for providing said operative surface with an information display front surface;
    a transparent protection layer which covers said information display front surface, said transparent protection layer being constructed as a structural base of the holographic ornament; and
    a protection tape bonded to a back surface of said hologram,
    wherein said means for providing said operative surface with an information display front surface comprises masking means which masks given portions of said operative surface to provide said information display front surface,
    wherein said masking means comprises an opaque tape member which is formed with at least one through cut, through which cut the operative surface of said hologram is visible,
    wherein said transparent protection layer comprises a transparent base member constructed as a structural base of the ornament, and
    wherein said transparent base member and said opaque tape member are bonded to each other by means of a transparent double-coated adhesive tape.

3. A holographic ornament as claimed in claim 2, in which said at least one through cut of said opaque tape member is shaped like a letter.

4. A holographic ornament comprising:
    a hologram (1,1) of reflection type having an operative surface by and on which an external light is diffused and reflected;
    a transparent base member (4,4) positioned beside said hologram wherein an inner surface thereof faces said operative surface, said transparent base member being constructed as a structural base of the holographic ornament,
    a masking member (2,2') interposed between the operative surface of said hologram (1,1) and the inner surface of said transparent base member (4,4), said masking member comprising at least one cut (50) through which the operative surface of said hologram is visible from one side of said transparent base member (4,4) thereby to provide said operative surface with an information display front surface; and
    a sheet member (5,10) bonded to a back surface of said hologram (1,1).

* * * * *